No. 846,994. PATENTED MAR. 12, 1907.
E. H. GOLD.
COUPLING.
APPLICATION FILED JULY 14, 1905.
2 SHEETS—SHEET 1.
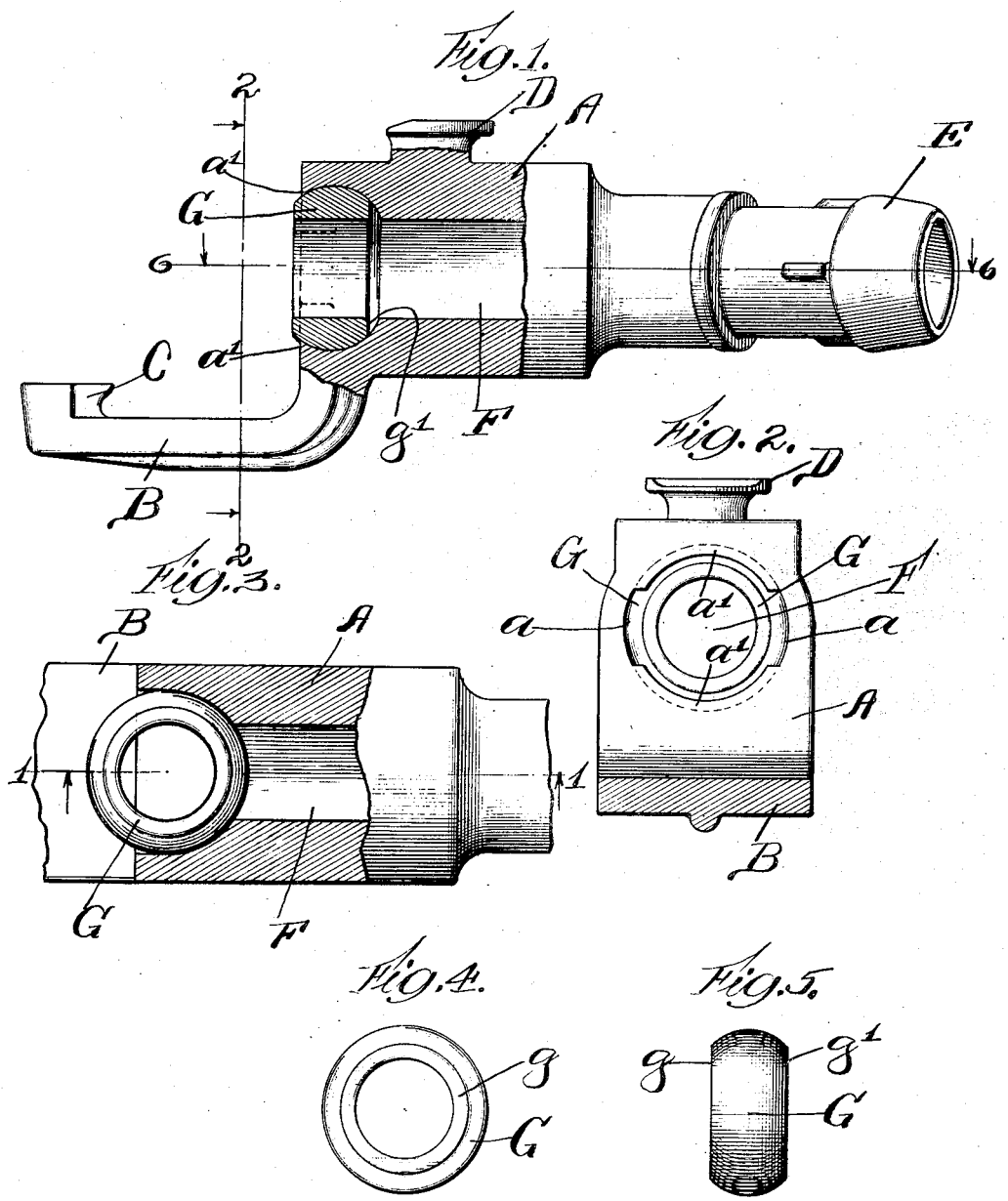
Witnesses:
J B Weir
G. V. Domarus
Inventor
Egbert H. Gold,
By Raymond Barnett
Attys.

No. 846,994. PATENTED MAR. 12, 1907.
E. H. GOLD.
COUPLING.
APPLICATION FILED JULY 14, 1905.
2 SHEETS—SHEET 2.
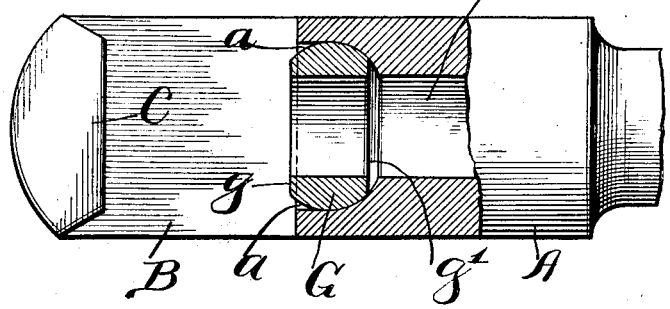
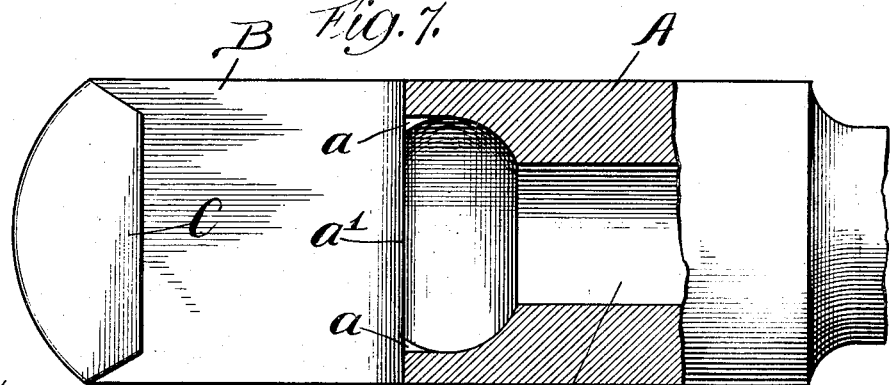
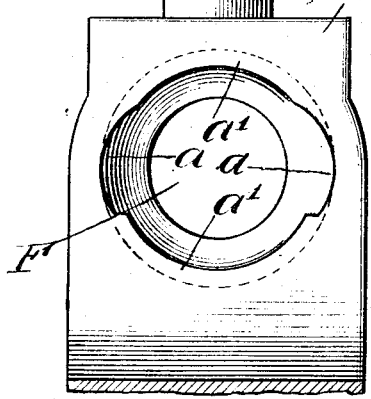
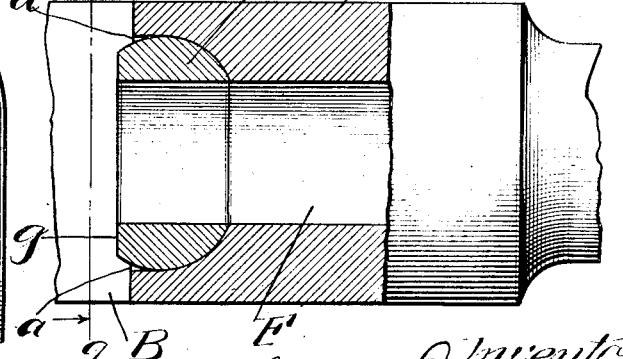
Witnesses:
J B Weir
Inventor:
Egbert H. Gold
By Raymond & Barnett
Attys

UNITED STATES PATENT OFFICE.

EGBERT H. GOLD, OF CHICAGO, ILLINOIS.

COUPLING.

No. 846,994. Specification of Letters Patent. Patented March 12, 1907.

Application filed July 14, 1905. Serial No. 269,641.

*To all whom it may concern:*

Be it known that I, EGBERT H. GOLD, a citizen of the United States, residing at Chicago, in the county of Cook and State of Illinois, have invented certain new and useful Improvements in Couplings, of which the following is a specification.

My invention relates to improvements in couplings for fluid-conduits, and is particularly and primarily intended for use in hose-couplings on railway-trains.

The object of my invention is to provide such a coupling of simple construction, wherein a suitable gasket may be readily seated and removed.

Another object of my invention is to provide such a coupling wherein the gasket may be reversed.

These and such other advantages as may hereafter appear are attained in my invention, a typical embodiment of which is shown in the drawings, in which—

Figure 1 is a longitudinal sectional view through a coupling and gasket. Fig. 2 is a view on the line 2 2 of Fig. 1 looking in the direction indicated by the arrows. Fig. 3 is a sectional view of the coupling with the gasket being inserted. Fig. 4 shows the gasket in front elevation. Fig. 5 is a side elevation of the gasket. Fig. 6 is a view on the line 6 6 of Fig. 1 looking in the direction indicated by the arrows. Fig. 7 is a longitudinal sectional view through the coupler without the gasket. Fig. 8 is a longitudinal sectional view of a modification. Fig. 9 is a view on the line 9 9 of Fig. 8 looking in the direction indicated by the arrows.

Like letters of reference indicate the same parts in the several figures of the drawings.

A indicates the body of a coupling, which for purposes of illustration is shown as of the familiar Sewall type, and is provided with a coupling-arm B, having a locking-lug C, and on the opposite side is provided with a locking-lug D.

E is the nipple.

F indicates the fluid-passage, and G the gasket.

When my invention is embodied in the form shown in the drawings, the gasket G forms a section of a sphere cut away on opposite sides to form the flat faces $g$ and $g'$. The coupling is provided with a concave seat adapted to receive the gasket, as shown in Fig. 1, and the opening in the face of the coupling A is cut away at $a$ $a$, so as to receive the gasket when inserted edgewise. To seat the gasket in the coupling, it is inserted edgewise into the gasket-seat, as shown in Fig. 3, whereupon the gasket is given a quarter-turn until it assumes the position shown in Fig. 1, in which position the gasket will be securely held in the coupling by the overhanging edges $a'$ $a'$, while the gasket will project slightly from the face of the coupling, as shown in Fig. 1, so as to engage the corresponding gasket on the opposite coupler. To remove the gasket, it is only necessary to reverse the operation by giving the gasket a quarter-turn until it can be withdrawn edgewise through the cut-away portions $a$ $a$, while, if desired, the gasket may be reversed after the face $g$ has been used, so as to cause the face $g'$ to project. If for any reason it be not desired to have the gasket reversible, the face $g'$ of the gasket may be dispensed with, as shown in Fig. 8, the rear face of the gasket rounding until it intersects the fluid-passage through the gasket, in which event the entire back of the gasket will rest in contact with and be supported by the body of the coupler, thus giving a solid support or backing for the entire face $g$.

While I have shown the invention embodied in its preferred form, it should be understood that the contour of the gasket and gasket-seat may be varied so long as the principles of construction and operation above set forth are adhered to.

I claim—

1. A coupler comprising a gasket-seat adapted to conform to a gasket forming a section of a sphere, a part of said face of the coupler overhanging the gasket-seat, said overhanging part being cut away to permit the insertion of the gasket.

2. A coupler comprising a concave gasket-seat, a portion of said coupler overhanging said gasket-seat, and a part of said overhanging portion being cut away to permit the insertion and rotation of a gasket, as described.

3. The combination with a coupler provided with a concave gasket-seat, a portion of said coupler overhanging said gasket-seat, and a part of said overhanging portion being cut away to receive a gasket, of a gasket provided with a flat face surrounding the passage through said gasket, and with convex surfaces, all so constructed and arranged that said gasket may be inserted in said gasket-seat through said cut-away portions and then turned to operative position.

4. The combination with a coupler provided with a spherical gasket-seat, a portion of said coupler overhanging said gasket-seat, and a part of said overhanging portion being cut away to receive the gasket, of a gasket forming a part of a sphere, said gasket having a flattened face surrounding the opening through said gasket and of less diameter than the maximum diameter of said gasket, all so constructed and arranged that said gasket may be inserted through the said cut-away part of the coupler and rotated to operative position.

EGBERT H. GOLD.

Witnesses:
 O. R. BARNETT,
 H. L. PECK.